July 7, 1959

W. F. BODISCH 2,893,308

BALING MACHINE

Filed March 28, 1958

INVENTOR
Wm. F. Bodisch
BY John N. Randolph
ATTORNEY

July 7, 1959

W. F. BODISCH 2,893,308

BALING MACHINE

Filed March 28, 1958

INVENTOR
Wm. F. Bodisch
BY John N. Randolph
ATTORNEY

July 7, 1959  W. F. BODISCH  2,893,308
BALING MACHINE
Filed March 28, 1958  11 Sheets-Sheet 5

INVENTOR.
Wm. F. Bodisch
BY
John N. Randolph
ATTORNEY

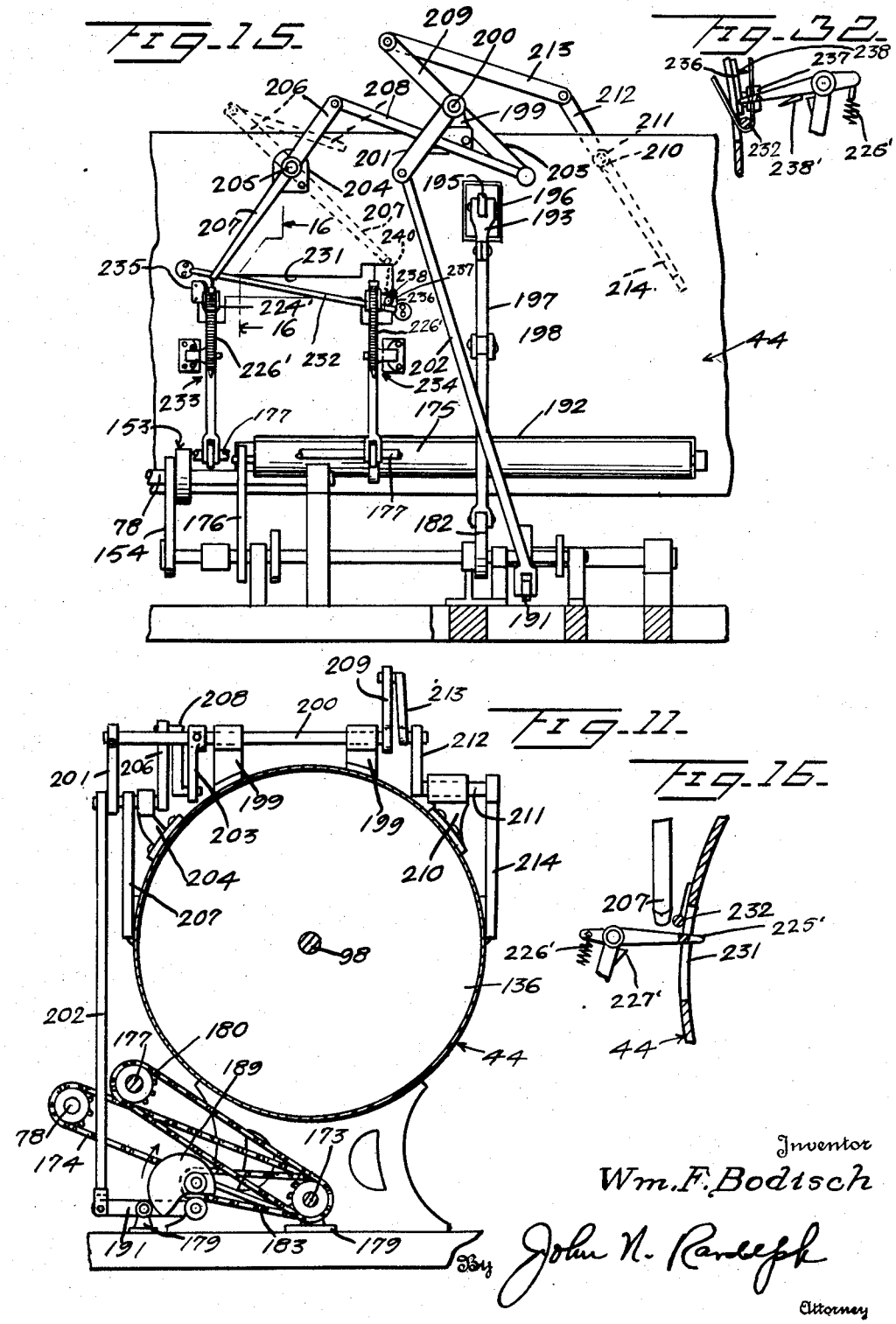

July 7, 1959

W. F. BODISCH 2,893,308

BALING MACHINE

Filed March 28, 1958

Inventor
Wm. F. Bodisch
By John N. Randolph
Attorney

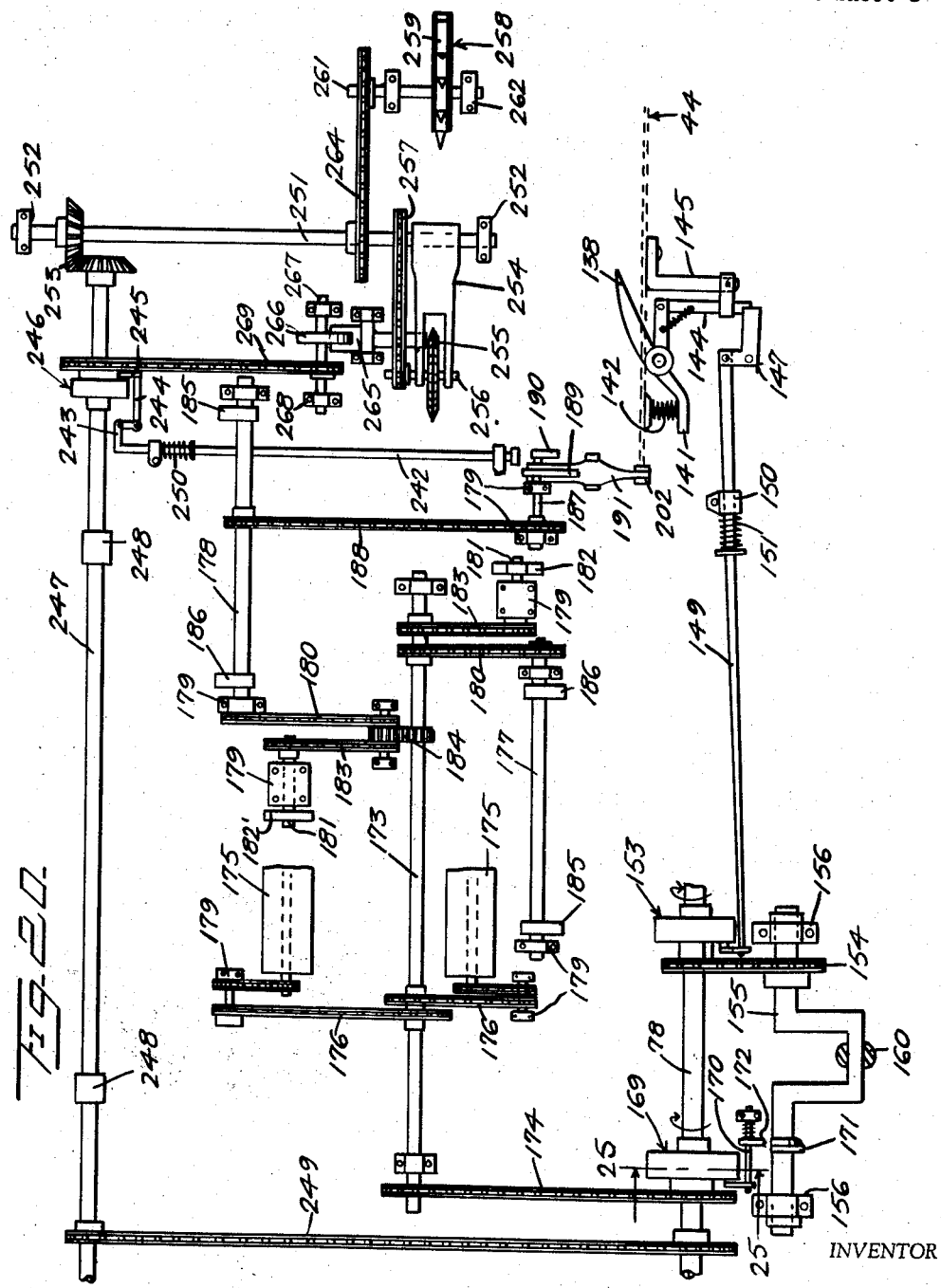

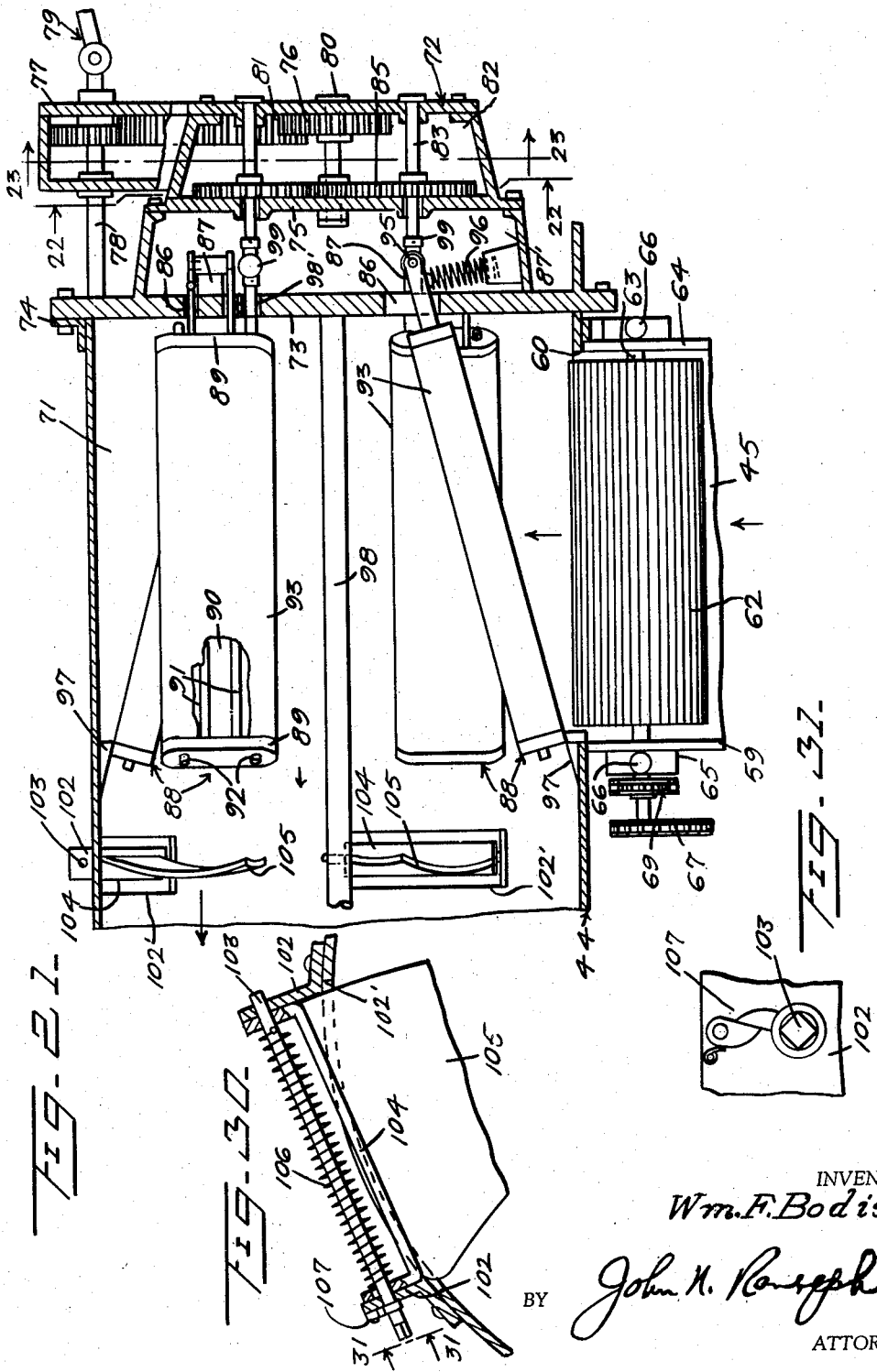

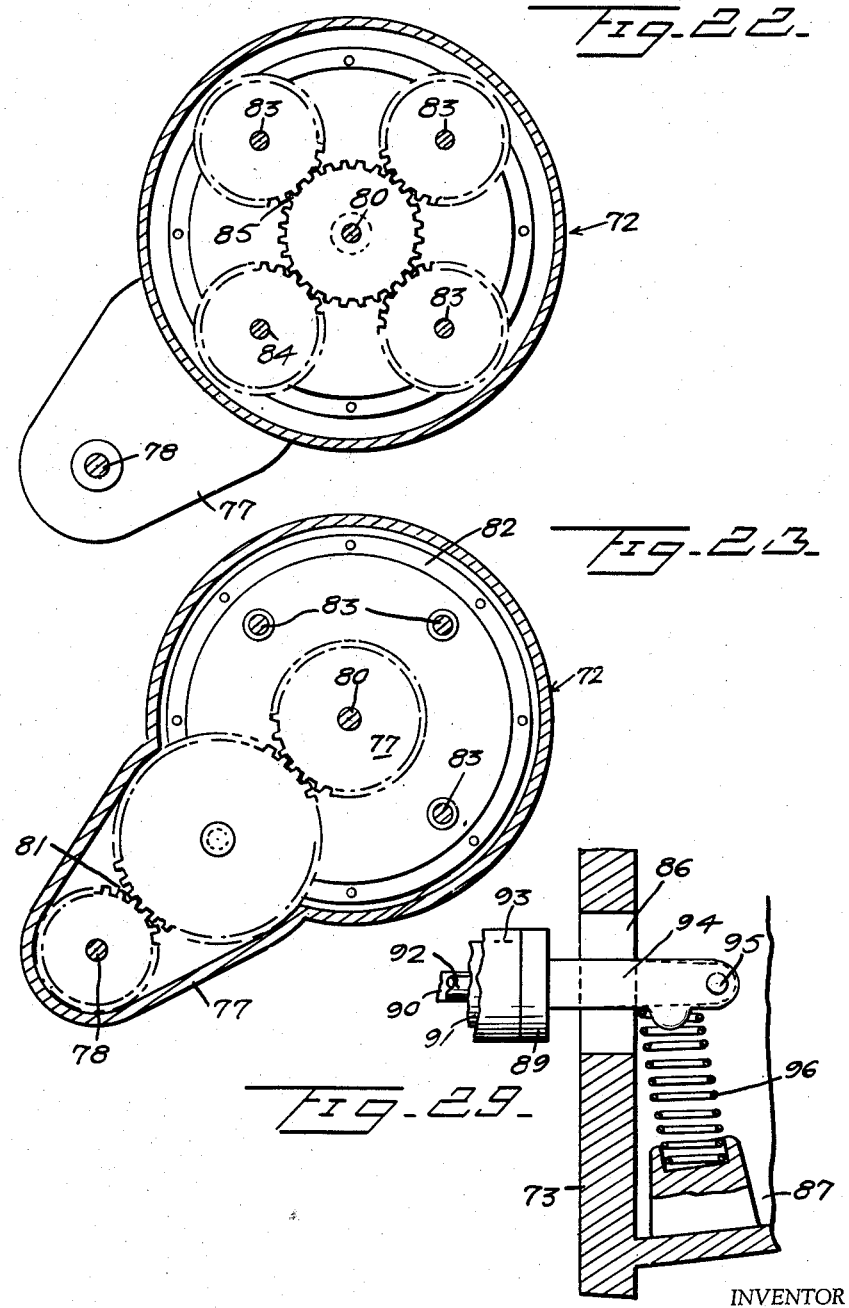

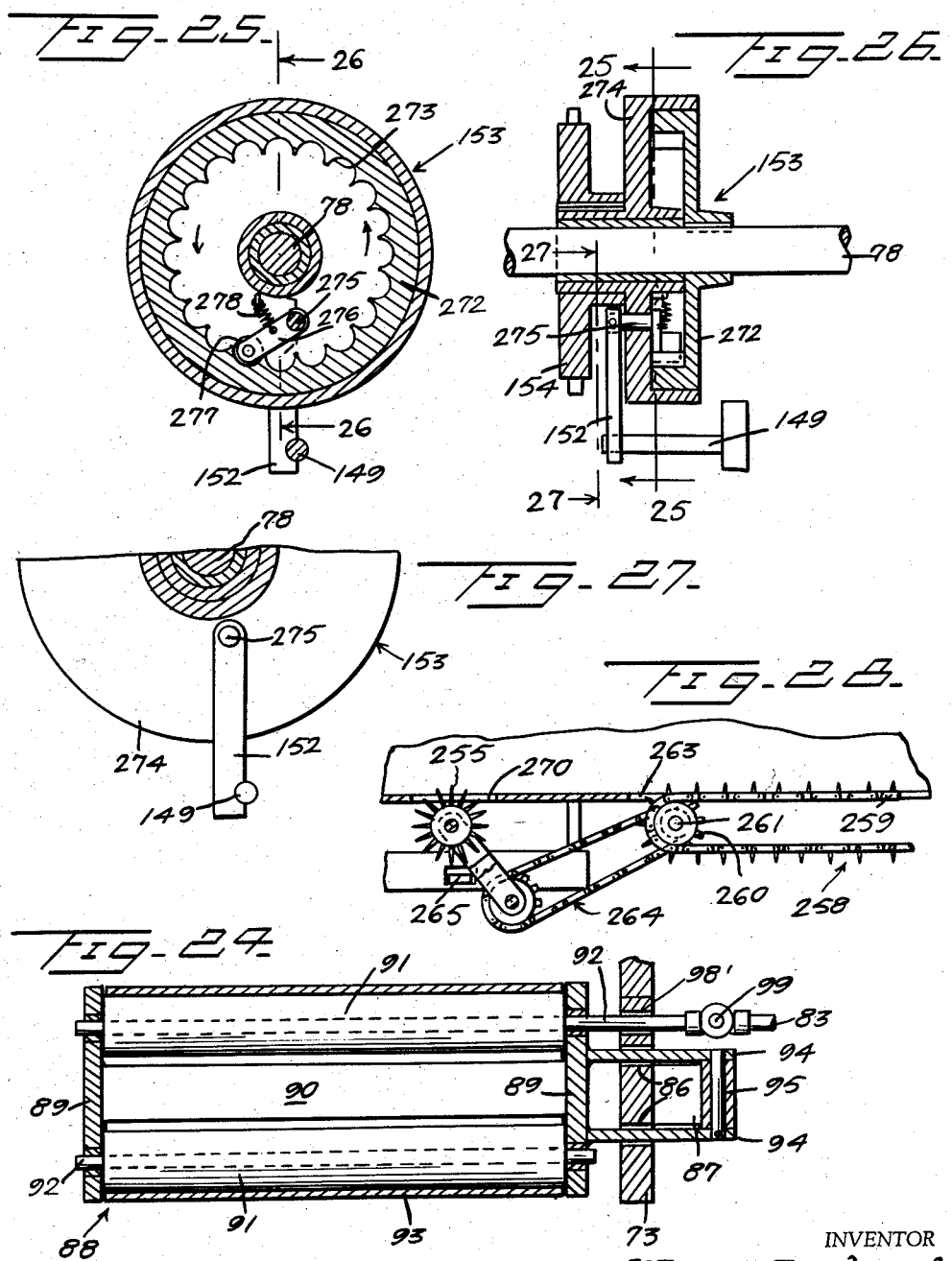

United States Patent Office 2,893,308
Patented July 7, 1959

2,893,308

BALING MACHINE

William F. Bodisch, Durango, Iowa

Application March 28, 1958, Serial No. 724,656

17 Claims. (Cl. 100—15)

This invention relates to a machine for baling hay, forage or the like and which is so constructed that its operation is fully automatic and continuous so that an operator is required only to drive and steer a draft vehicle to which the baler is connected.

More particularly, it is an aim of the present invention to provide a baler capable of picking up loose material from the ground or from a single and irregular windrow and of feeding such material into a forward portion of the machine and of subsequently discharging the material from the trailing end of the machine in the form of a smooth bale securely tied with twine.

Another object of the invention is to provide a baler capable of producing a bale having a bore extending longitudinally therethrough for providing ventilation to prevent spoilage and molding at the center of the bale.

A further object of the invention is to provide a baling machine wherein an automatic continuous baling operation can be accomplished without the machine being stopped for any part of the operation, so that uninterrupted movement of the baler is possible.

A further object of the invention is to provide a baler having an extremely low center of gravity enabling it to operate efficiently on rough and uneven terrain.

Still a further object of the invention is to provide a machine which will produce bales of uniform dimensions.

Various other objects and advantages of the invention will hereinafter become more fully apparent from the following description of the drawings, illustrating a presently preferred embodiment thereof, and wherein.

Figure 1:
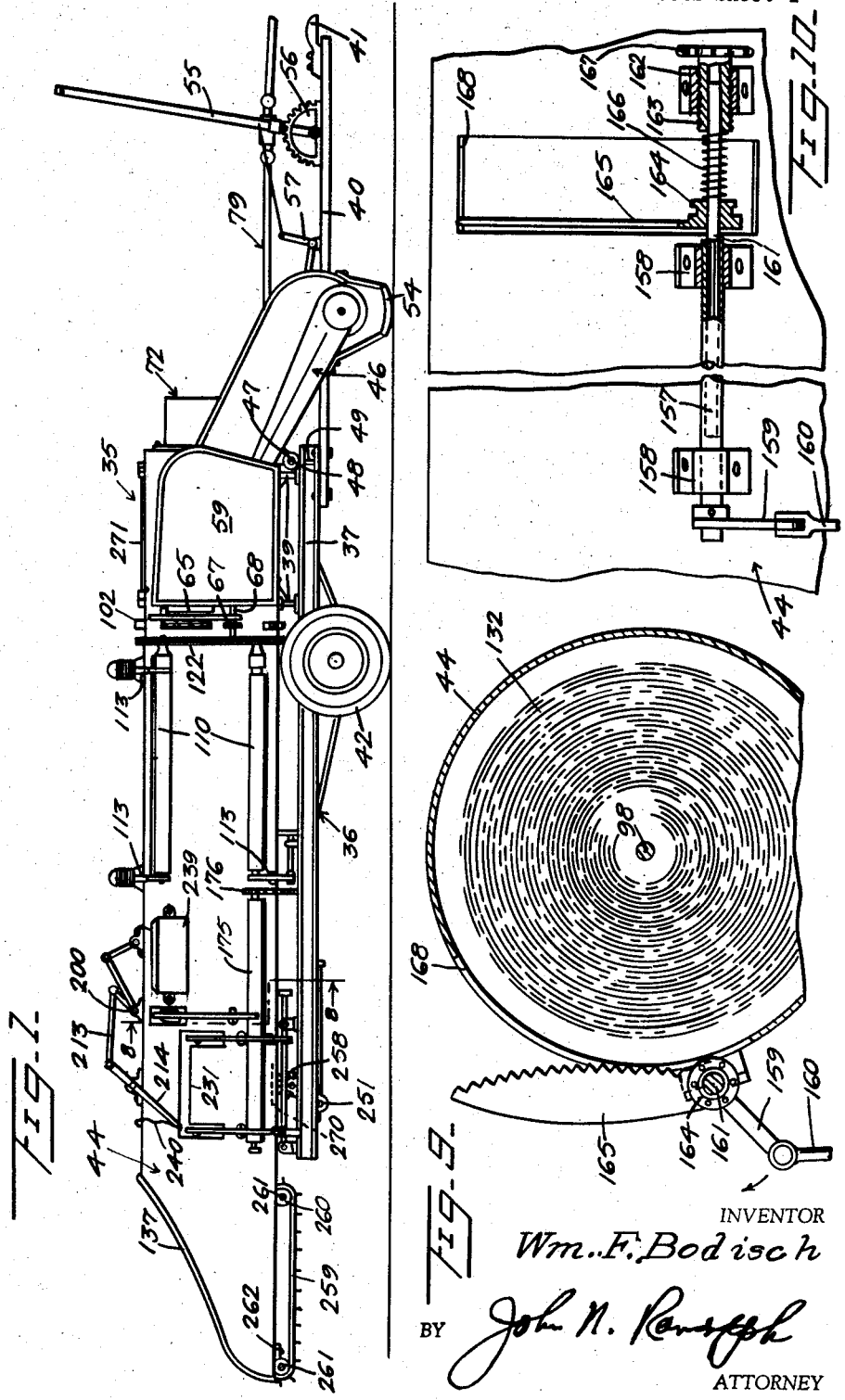
Figure 1 is a side elevational view looking toward the right hand side of the baling machine.
Figure 2:
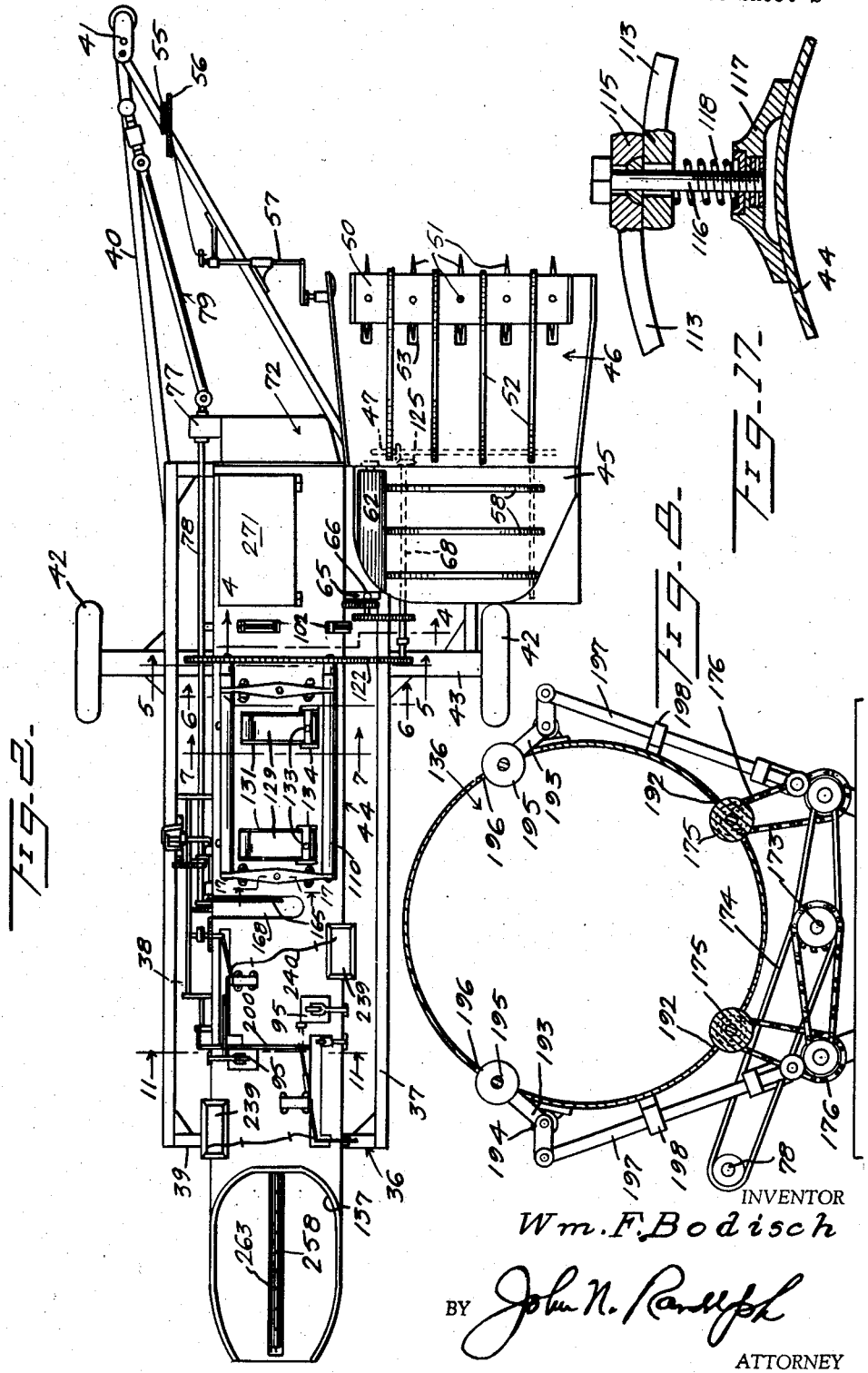
Figure 2 is a top plan view thereof.
Figure 3:
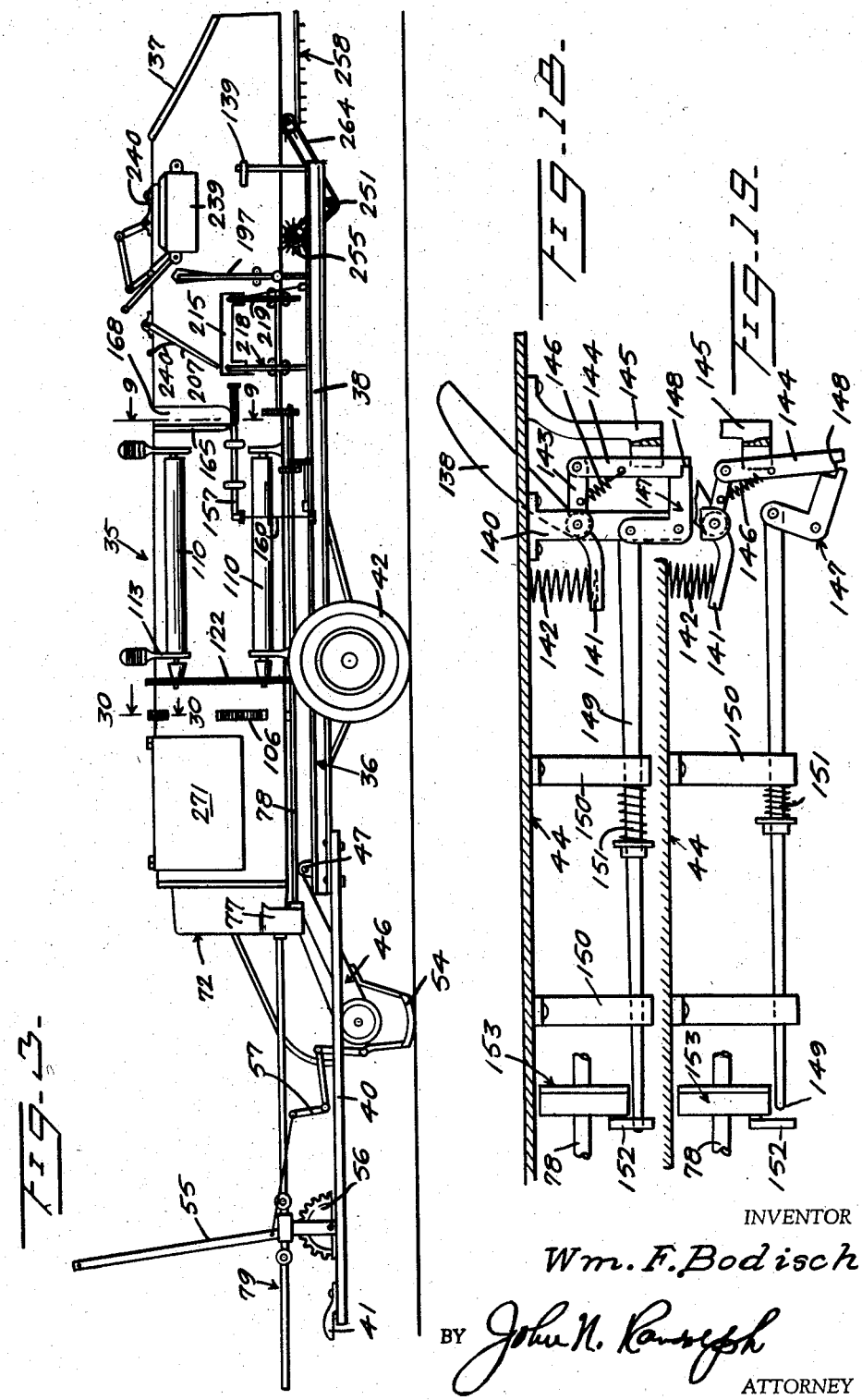
Figure 3 is a side elevational view, partly broken away, looking toward the left hand side of the baler.
Figure 12:
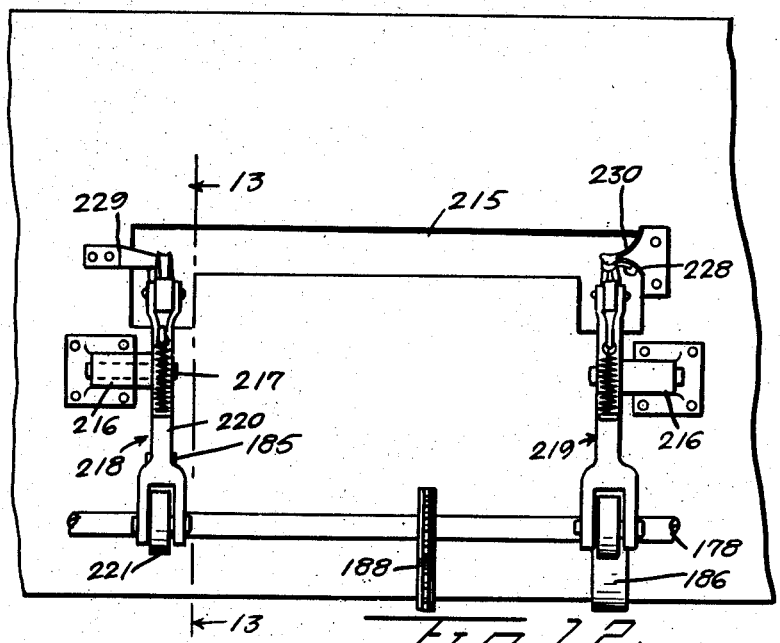
Figure 13:
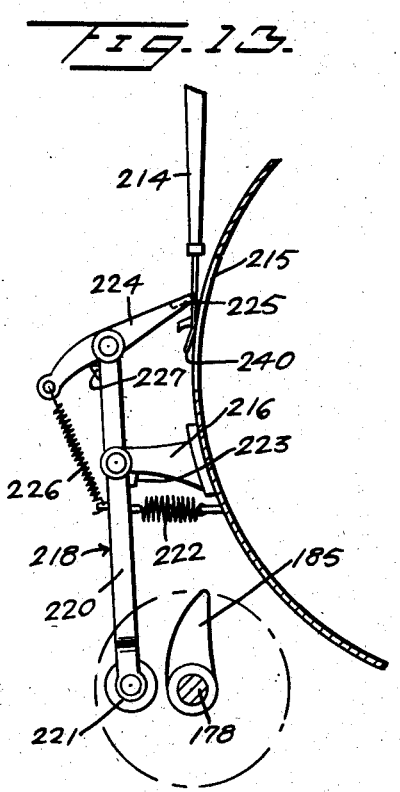
Figure 14:
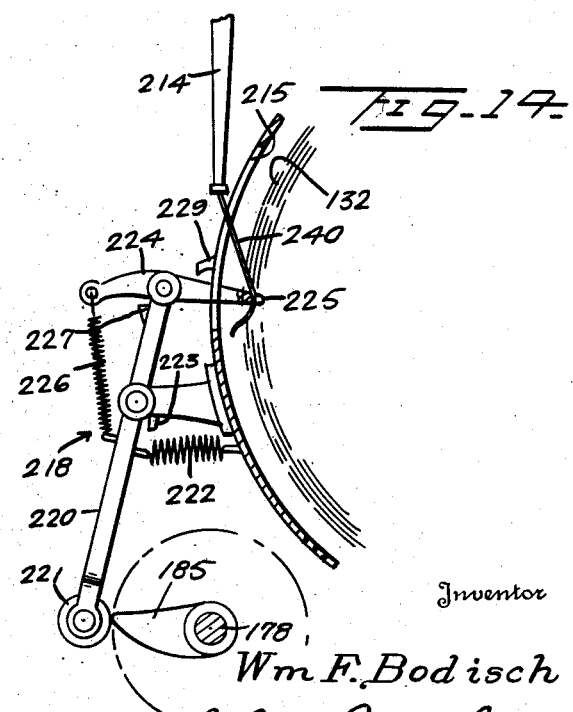

Figures 4, 5, 6 and 7 are enlarged fragmentary cross sectional views taken substantially along planes as indicated by the lines 4—4, 5—5, 6—6 and 7—7, of Figure 2;

Figure 8 is an enlarged fragmentary cross sectional view taken substantially along the line 8—8 of Figure 1;

Figure 9 is an enlarged fragmentary cross sectional view, taken substantially along a plane as indicated by the line 9—9 of Figure 3;

Figure 10 is an enlarged fragmentary side elevational view of a portion of the baler, looking from left to right of Figure 9;

Figure 11 is an enlarged fragmentary cross sectional view, taken substantially along a plane as indicated by the line 11—11 of Figure 2;

Figure 12 is a fragmentary side elevational view of a portion of the baler, looking at the left hand side thereof;

Figure 13 is a vertical sectional view, taken substantially along a plane as indicated by the line 13—13 of Figure 12;

Figure 14 is a view similar to Figure 13 but illustrating another position of the parts;

Figure 15 is a fragmentary enlarged side elevational view looking toward a portion of the left hand side of the baler;

Figure 16 is a fragmentary sectional view, taken along the line 16—16 of Figure 15;

Figure 17 is an enlarged fragmentary transverse sectional view, taken substantially along the line 17—17 of Figure 2;

Figure 18 is an enlarged longitudinal sectional view through a part of the rear portion of the left hand side of the machine;

Figure 19 is a view similar to Figure 18 but illustrating a different position of certain of the parts;

Figure 20 is a view in top plan illustrating portions of the driving mechanism of the baling machine;

Figure 21 is an enlarged substantially horizontal sectional view through a forward portion of the baling machine;

Figures 22 and 23 are transverse sectional views, on somewhat enlarged scales, taken substantially along planes as indicated by the lines 22—22 and 23—23 of Figure 21;

Figure 24 is a somewhat enlarged longitudinal sectional view of one of the forming units of Figure 21;

Figure 25 is a sectional view through one of the clutches of the machine taken substantially along a plane as indicated by the line 25—25 of Figure 26;

Figure 26 is a sectional view taken substantially along a plane as indicated by the line 26—26 of Figure 25;

Figure 27 is a sectional view taken substantially along a plane as indicated by the line 27—27 of Figure 26;

Figure 28 is a fragmentary longitudinal vertical sectional view taken through a part of the lower portion of the rear end of the machine;

Figure 29 is a fragmentary radial sectional view on an enlarged scale of a portion of the structure as shown in Figure 21;

Figure 30 is a fragmentary sectional view on an enlarged scale taken along the line 30—30 of Figure 3;

Figure 31 is an enlarged fragmentary view in elevation looking in the direction as indicated by the line 31—31 of Figure 30; and Figure 32 is a detailed transverse vertical sectional view of a portion of the mechanism illustrated in Figure 15.

Referring more specifically to the drawings, the baling machine in its entirety is designated generally 35 and includes a chassis 36 composed of transversely spaced longitudinally extending sill members 37 and 38 and a plurality of longitudinally spaced cross members 39 which extend between and connect the sill members. A rigid draft tongue 40 is rigidly secured to and extends from the forward end of the chassis 36 and is provided at its forward end with a conventional coupling element 41 for coupling the machine 35 to a tractor or other draft vehicle, not shown, by which the machine is to be pulled. A pair of ground engaging wheels 42 are journaled on the ends of an axle 43 to provide a mobile support for the machine 35. Said axle and wheels are disposed nearer the forward end than the rear end of the chassis 36 and the wheels 42 are spaced outwardly from the sill members 37 and 38, as seen in Figure 2. Also, as seen in this figure, the tongue 40 extends at an angle from the forward end of the chassis 36 so that the coupler 41 is laterally offset from the chassis.

The baling machine 35 includes an elongated tubular body 44 which extends from end-to-end of the chassis 36 and to beyond the rear end thereof and which is rigidly supported on and secured to the cross members 39. A platform 45 is rigidly secured to and extends laterally from the forward portion of the sill member 37. A scoop 46 is pivotally supported at its upper rear edge along the forward edge of the platform 45 for pivotal movement about an axis formed by a shaft 47 which is journaled in bearings 48, as seen in Figure 1, which are supported by a laterally extending frame portion 49 of the chassis 36. A drum 50 is journaled in the lower forward portion of the scoop 46 and is provided with longitudinally and circumferentially spaced outwardly extending spikes 51 for picking up forage or other material to be baled. The drum 50 is connected to the shaft 47 by a sprocket and chain drive 52. The upper flights of the chains of said drive travel upwardly over the upper surface of the scoop 46 to form with the drum 50 and spikes 51 an elevator for conveying the material to be baled onto the platform 45. The forward portion of the scoop 46 is recessed as seen at 53 (Figure 2) to accommodate the drum 50 and spikes 51. Shoes 54 (Figure 1) are secured to and disposed beneath the forward end of the scoop 46 to limit the extent that said forward end of the scoop can swing downwardly. The scoop and platform are disposed to the side of the chassis 36 which is located remote from the coupler 41. A manually operated lever 55, having a conventional latch 56, is pivotally mounted on the forward portion of the tongue 40 and is connected by a link and lever means 57, as best seen in Figure 2, to one side of the lower end of the scoop 46 for raising said lower end of the scoop and the elevator and for retaining said parts in a raised position.

Figure 4:
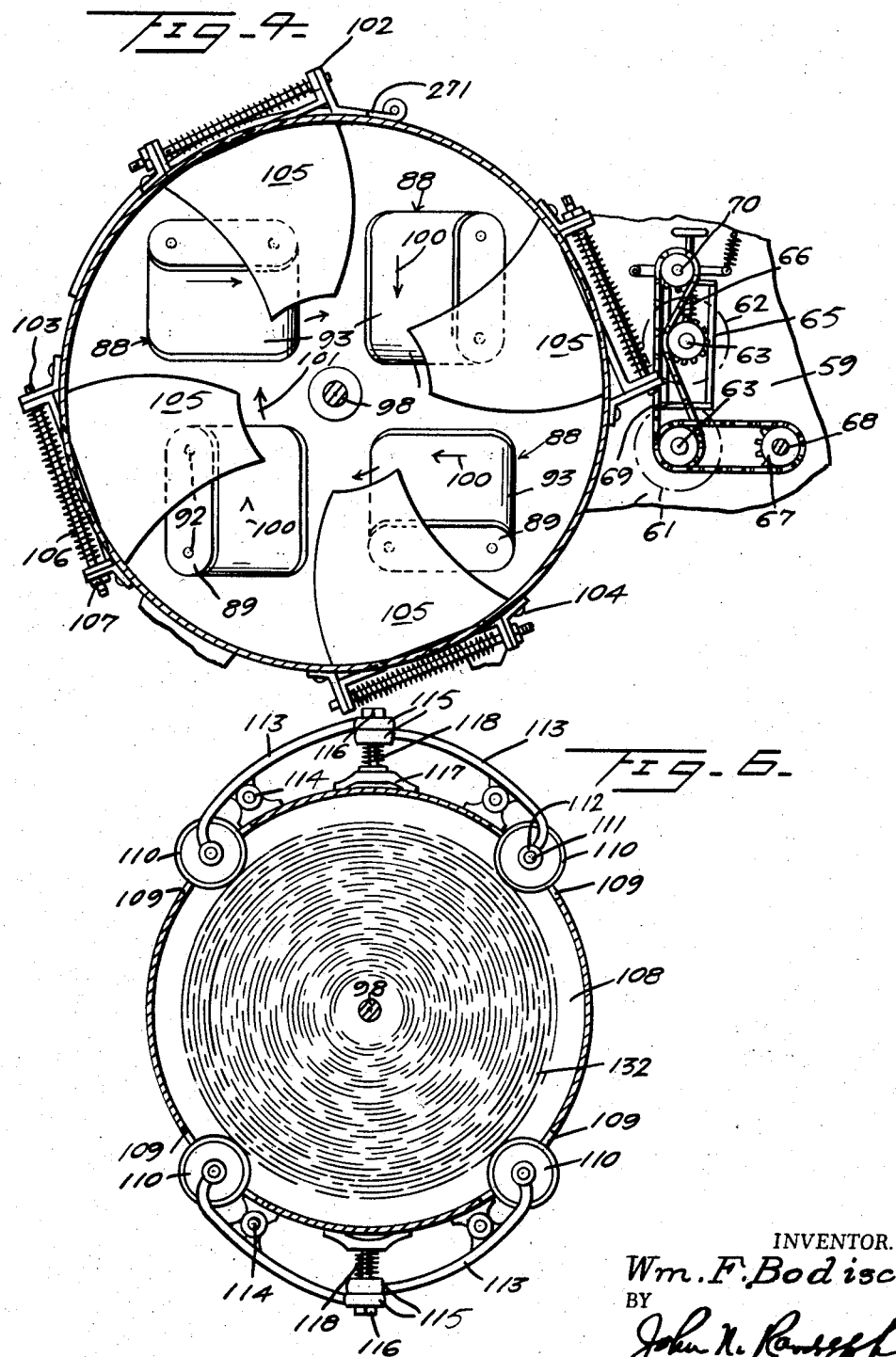

The platform 45 is provided with endless conveyor means 58 for conveying material inwardly of said platform as it received thereon from the upper end of the elevator 52. The platform 45 is provided with walls 59 at its outer end and back edge to prevent escape of the material therefrom. The body 44 is provided with an entrance opening 60 in the right hand side thereof and which opens toward the platform 45, as seen in Figure 21. Vertically spaced compressing rolls 61 and 62 are disposed above the inner end of the platform 45 adjacent the opening 60 and are fixed to shafts 63. End portions of the shafts 63 are journaled in and extend through the rear wall 59 and a front mounting flange 64, as seen in Figure 21. The ends of the shaft 63 of the upper roll 62 are disposed in guideways 65 which permit vertical movement of said shaft 63 and the upper roll 62. Guideways 65 are provided with spring means 66 for urging the upper roll 62 downwardly toward the lower roll 61. As seen in Figure 4, the shaft of the lower roll 61 is driven counterclockwise by a sprocket wheel and chain drive 67 from a shaft 68 which is journaled in the rear wall 59. The shaft 63 of the upper roll 62 is driven clockwise by a sprocket wheel and chain drive 69 from the shaft of the lower roll, and which last mentioned sprocket wheel and chain drive is provided with a pivotally mounted resilient chain tightener 70. Thus, the compressing rolls 61 and 62 revolve in directions for feeding material from the platform 45 inwardly through the inlet opening 60, as indicated by arrows in Figure 21, and the material thus supplied to the forward part of the body 44, constituting the forming chamber 71, is compressed into a flat sheet in passing between the compressing rolls 61 and 62.

A gear housing 72, as seen in Figure 21, includes a rear plate 73 which is bolted to the externally flanged open forward end 74 of the baler body 44. The gear housing 72 has a partition wall 75 disposed between and spaced from its rear wall 73 and front wall 76. The front portion of the gear housing 72 has a lateral enlargement 77 at the left hand side thereof. The forward portion of a main drive shaft 78 extends through and is journaled in the gear housing portion 77. The forward end of the shaft 78 is connected to the power takeoff shaft of the tractor, not shown, constituting the draft vehicle of the baler, by a flexible shaft 79 composed of shaft sections connected by universal joints, as seen in Figure 2. As seen in Figure 23, the drive shaft 78 is connected to a centrally disposed shaft 80 by a gear train 81 which is contained in the housing extension 77 and the housing chamber 82, formed by the walls 75 and 76. The center shaft 80 is journaled in central portions of the walls 75 and 76, as seen in Figure 21. Three shafts 83 and a shaft 84 extend through the wall 75 and are disposed around and equally spaced from the center shaft 80. The shafts 83 extend through the front wall 76. The shaft 84, which is in line with a portion of the gear train 81, is journaled only in the partition 75. Meshing gears 85, as seen in Figure 22, provide a drive between the shaft 80 and the shafts 83 and 84 so that said latter shafts are driven in unison and in the same direction by the center shaft 80.

As seen in Figures 21 and 24, the inner or rear wall 73 is provided with pairs of elongated parallel slots 86, four of such pairs of slots being provided. The wall 73 has projections 87 extending from its inner side and which are disposed between the slots of each pair of slots 86 and extend into the rear chamber 87' of the gear housing 72. Four forming members 88, as seen in Figures 4 and 21, are mounted in the forming chamber 71. Each forming member 88 includes spaced end plates 89 connected by a bar 90. Said parts 89 and 90 form the frame of the forming member. Each forming member 88 includes a pair of rollers 91 which are disposed between the end plates 89. Shafts 92 extend centrally through and are fixed to the rollers 91 and have end portions journaled in the end plates 89 for rotatably mounting the rollers 91 between said end plates. An endless web 93 is trained around each pair of rollers 91. As seen in Figures 21, 24 and 29, the end plates 89, which are located adjacent the housing wall 73, are each provided with a pair of bars 94 which project therefrom loosely through the slots of a pair of the slots 86 and have free end portions straddling the projection 87, located therebetween. A pivot pin 95 extends through said bars 94 and the projection 87 for swingably mounting the forming member 88 within the forming chamber 71. The forming members 88 are thus mounted for swinging movement generally toward and away from one another and toward and away from the wall of the body 44. Said forming members 88 are disposed with their planes at various angles to the horizontal and vertical planes of the body 44, as best seen in Figures 4 and 21. Compression springs 96 (Figures 21 and 29) are mounted in the chamber 87' and bear against the bars 94 for urging the forming members 88 to swing inwardly relative to one another, one such spring 96 being provided for each forming member 88 and engaging one bar 94 thereof. Stops 97 are secured to the inner side of the body 44, as seen in Figure 21, and are disposed to be engaged by the rear free ends of the forming members 88 for limiting outward swinging movement thereof. A rod 98 is detachably secured at its forward end to the central portion of the rear wall 73 and extends therefrom longitudinally through a major portion of the body 44 and is centrally disposed therein.

One shaft 92 of each forming member 88 extends from the forward end plate 89 thereof loosely through an opening 98' in the wall 73. Said shaft ends are connected to rear ends of the shafts 83 and 84 by universal joints 99, whereby the rollers 91 of said forwardly extending shafts 92 are all driven in the same direction for driving all of the endless webs 93 in the same direction, as indicated by the arrows 100 in Figure 4. Thus, as the hay or forage, compressed into a flat sheet, is directed inwardly through the inlet 60 by the rolls 61 and 62 it will by contact with the adjacent flights of the webs 93 be caused to travel in a clockwise direction, as indicated by the arrows 101 (Figure 4) around the rod 98. The material to be baled will thus be wound clockwise by the webs 93 of the forming members 88 into a cylinder which will assume a slightly conical shape with a forward taper, due to the fact that as the material is rolled and compressed by the forming members 88 it will gradually assume sufficient mass to compel said forming members to yield outwardly to assume rearwardly diverging positions relative to one another, as illustrated in Figures 4 and 21. Accordingly, the rolled mass will be compressed to a greater extent adjacent the forward ends of the forming members 88 than adjacent the rear ends thereof. Consequently, the rolled mass will move rearwardly of the body 44 due to this lesser resistance afforded at the rear ends of the forming members 88.

The body 44 at the rear end of the forming chamber 71 has circumferentially elongated slots 102'. As best seen in Figure 30, bearing members 102 are mounted externally of the body 44 at the ends of the slots 102'. A shaft is journaled in each pair of bearings 102. Each such shaft 103 supports a yoke member 104 which is journaled thereon. A resistor plate 105 is fixed to each yoke 104 and extends inwardly therefrom loosely through the slot 102'. A torsion spring 106 is carried by each shaft 103 and is anchored thereto and to the yoke 104. The springs 106 urge the resistor plates 105 to swing forwardly toward the forming chamber 71. The tension of the springs 106 can be varied by turning the shafts 103 clockwise, as seen in Figure 31, for winding and tensioning the springs 106. A pawl and spring arrangement 107 connected to the shaft 103 and a bearing 102 engaged by said shaft, prevents counterclockwise rotation of the shaft 103 and which would result in unwinding of the spring 106. One end of each shaft 103 may be square to receive a turning tool, as illustrated in Figures 30 and 31. As the compressed roll or bale builds up in thickness and density in the forming chamber 71 and moves rearwardly thereof, its rearward movement will be resisted by the plates 105 until the rolled material is sufficiently large and dense to force the plates 105 to yield rearwardly away from the forming chamber 71 to allow the material to pass therefrom rearwardly into the intermediate portion of the body 44 and which constitutes the compressing chamber 108 of the baler 35.

Figure 5:
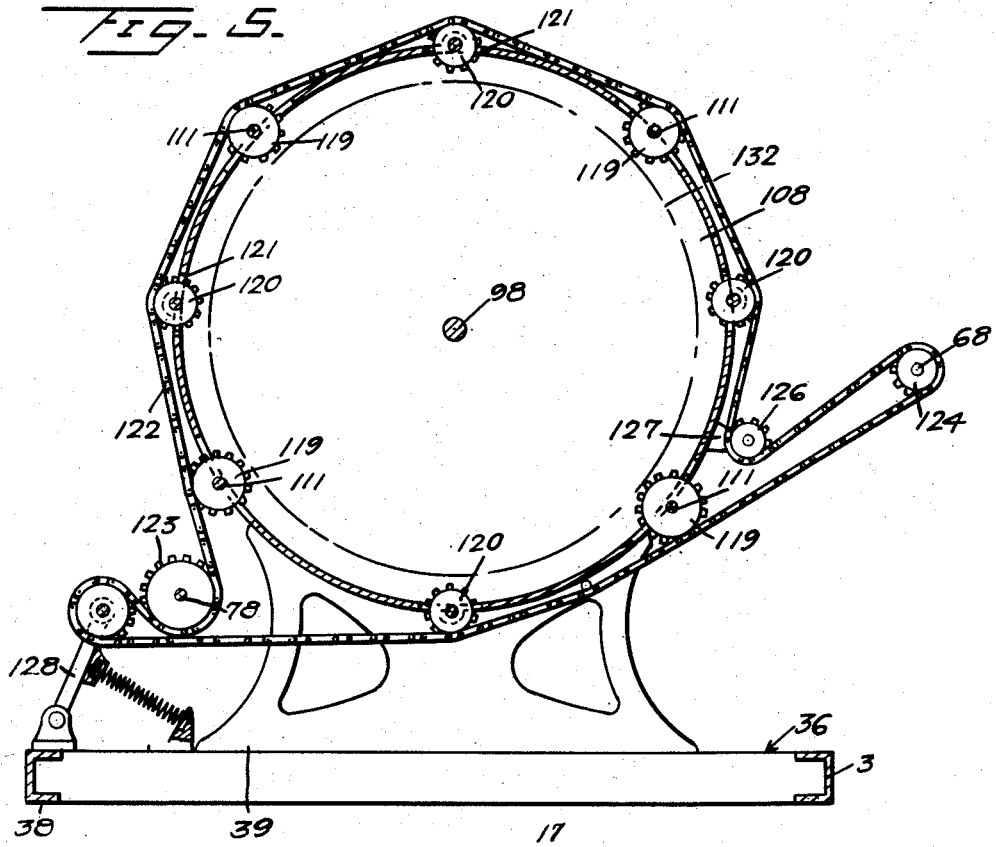
Figure 7:
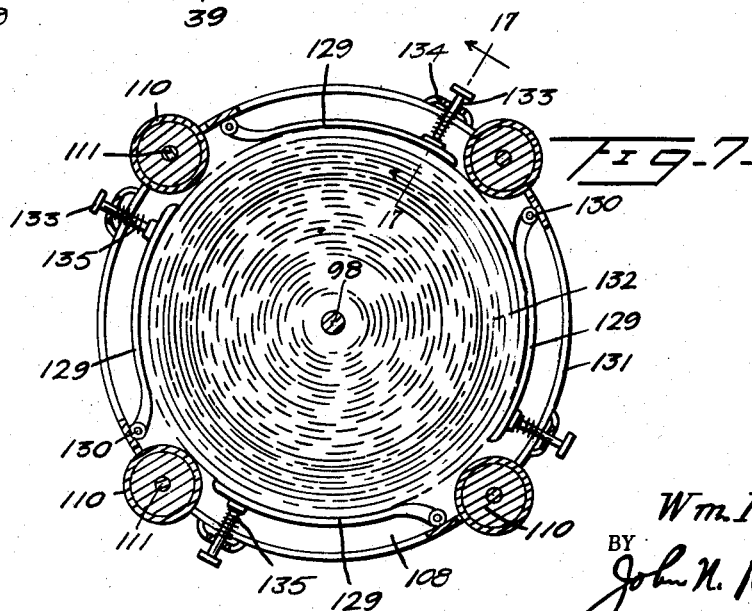

The compressing chamber 108, which commences immediately behind the resistor plates 105, is illustrated in Figures 5, 6 and 7. The portion of the wall of the body 44, forming the chamber 108, is provided with elongated longitudinally extending circumferentially spaced openings 109 in which elongated compressing rollers 110 are rotatably mounted, as best seen in Figure 6. Shafts 111 which extend centrally through and are fixed to the rollers 110 are journaled in bearings 112 formed on complementary ends of rocker arms 113. The rocker arms 113 extend circumferentially of the body 44 and are pivotally mounted externally thereof on pivots 114. Adjacently disposed circumferentially aligned rocker arms 113 have overlapping apertured opposite ends 115 which loosely engage a bolt 116. The inner end of each bolt 116 is threadedly mounted adjustably in a support 117 which is secured externally to the body 44 and the rocker arm ends 115 are limited in their outward swinging movement by the bolt head. Each bolt 116 carries a compression spring 118, between the support 117 and the rocker arm ends 115, so that said ends 115 are urged outwardly to cause the rocker arms 113 to rock on their pivots 114 to displace their bearing ends 112 and the rollers 110 inwardly of the forming chamber 108.

The shafts 111 have sprocket wheels 119 fixed to their forward ends and idler sprocket wheels 120 are rotatably mounted in other openings 121 of the body 44, between the sprocket wheels 119. An endless chain is trained around the sprocket wheels 119 and over the sprocket wheels 120 and is held thereby out of contact with the tubular body 44, as seen in Figure 5. The endless chain 122 is trained under a sprocket wheel 123 fixed to the drive shaft 78 and is driven thereby to revolve the sprocket wheels 119 and rollers 110 in a counterclockwise direction as seen in Figures 5 and 6. The chain 122 also engages a sprocket wheel 124 which is fixed to the shaft 68 to provide means for driving the compressing rolls 61 and 62. As seen in Figure 2, the shaft 68 forms one end shaft of the conveyor 58 which is also thus driven by the endless chain 122. Additionally, the shaft 68 is connected by the bevel gears 125 to the shaft 47, which forms an end shaft of the elevator 52, for also furnishing power to operate said elevator. The chain 122 is trained under an idler sprocket wheel 126 which is supported by a bracket 127 which extends outwardly from the body 44 and by means of which the chain can engage the sprocket wheel 124 and all of the sprocket wheels 119 and 120, as seen in Figure 5. Proper tension is maintained on the chain 122 by a resilient chain tightener 128 which is spring urged to swing outwardly and away from the sprocket wheel 123.

As seen in Figure 7, compressing plates 129 are mounted in the compressing chamber 108 and are pivotally supported at corresponding ends thereof at 130. The plates 129 are pivoted at 130 to the inner side of the body 44 beyond corresponding ends of circumferentially elongated openings 131. The pressure plates 129 are mounted inwardly with respect to said openings 131 and extend circumferentially from their pivoted ends 130, as seen in Figure 7, and in a direction corresponding to the direction of rotation of the rolled mass or bale 132. The rolled mass or bale 132 within the compressing chamber 108 is substantially circular in cross section since successive portions of the mass leaving the forming chamber 71 are substantially circular. This results from the fact that the rolled mass 132 is progressively fed from the forming chamber 71 into the compressing chamber 108 and is building up in the forming chamber while other portions thereof are being forced rearwardly into the compressing chamber. As seen in Figure 7, pins 133 extend slidably through bridge members 134 which bridge the openings 131. Inner ends of the pins 133 are detachably secured to the free ends of the pressure plates 129 and the headed outer ends of the pins 133 limit inward swinging movement of the plates 129. Compression springs 135 are mounted on the pins 133 between the plates 129 and bridges 134 for urging said plates 129 to swing inwardly against the clockwise rotating mass 132. The mass 132 of the material within the compressing chamber 108 is of full diameter and will be tightly compressed as it is revolved clockwise, as seen in Figures 6 and 7, by the revolving compressing rolls 110. In addition, said rolls 110 which are spring urged inwardly by the springs 118 and the compressing plates or shoes 129, which are urged inwardly by the springs 135, will tightly compress the rolled mass 132 during its rearward travel through the compressing chamber 108. However, the rod 98 will maintain a hollow bore through the center of the rolled mass 132.

The rolled mass 132 will be forced rearwardly from the compression chamber 108 into the twining chamber 136 which constitutes the rear portion of the body 44. As the leading end of the mass 132 approaches the opening 137 in the rear end of the body 44 it will strike a trip lever 138 which extends inwardly and rearwardly of the body 44 through an opening 139 in the left hand side of the rear portion of the body. As seen in Figure 18, the trip lever 138 is pivotally mounted externally of the body 44 on a bracket 140 and has an extension 141, extending beyond its pivot and which is engaged by a compression spring 142, which urges the trip lever 138 to swing inwardly of the chamber 136. A lever arm 143 is fixed to and extends rearwardly from the pivoted end of the trip 138 and is pivoted to one end of a trigger 144. Trigger 144 extends outwardly from the lever arm 143 and is guided for sliding and limited rocking movement by a guide 145. A tension spring 146 connects the arm 143 and trigger 144 and urges the trigger to swing away from the guide 145. A bell crank 147 is pivotally mounted at its apex on an extension of the bracket 140 and has a rearwardly extending arm the distal end of which engages the distal end of the trigger 144, and which distal ends are provided with normally interfitting notches, as seen at 148. The other, inwardly extending arm of the bell crank 147 is pivotally connected to the rear end of a rod 149 which is slidably supported in guides 150 which project outwardly from the body 44. A compression spring 151, carried by the rod 149, urges said rod forwardly into its position of Figure 18 and resists clockwise swinging movement of the bell crank 147. The forward end of rod 149 normally engages under an actuating lever 152 of a clutch 153 for holding said clutch disengaged. One half of the clutch 153 is secured to the main drive shaft 78 and the other half thereof has a sprocket wheel fixed thereto, as seen in Figure 20, and which forms a part of a sprocket wheel and chain drive between the shaft 78 and a crankshaft 155, which is driven by said sprocket wheel and chain drive 154 when the clutch 153 is engaged.

When the mass 132 engages the trip lever 138 to swing said trip lever outwardly, the trigger 144 is forced outwardly to rock the bell crank 147 in a clockwise direction, as seen in Figure 19, to thus retract the forward end of the rod 149 out of engagement beneath the clutch actuator 152 to allow the clutch 153 to assume an engaged position for driving the crankshaft 155. The actuator 152 travels with the clutch 153. The notched end 148 of the bell crank 147 will be disengaged from the notched end of the trigger 144 as said parts move slightly beyond their positions of Figure 19, permitting the spring 151 to return the forward end of the rod 149 to its position of Figure 18, so as to engage the actuator 152 when the clutch 153 has completed a rotation to thus return the clutch 153 to a disengaged position. The spring 146 permits the trigger 144 to yield away from the notched end of the bell crank 147 so that said bell crank can be swung counterclockwise back to its position of Figure 18 and while the trigger 144 is retained in its extended position of Figure 19. As the sprocket wheels of the drive 154 are the same diameter, the crankshaft 155 will be caused to make one complete revolution each time that the clutch 153 is engaged by retraction of the rod 149.

Crankshaft 155 is journaled in bearings 156 which are mounted on the chassis sill 38. A hollow internally splined shaft 157 is journaled in bearings 158 which are secured to the left hand side of the body 44. A crank 159 is fixed to and extends outwardly from the forward end of the shaft 157. A connecting rod 160 connects the crank of the crankshaft 155 to the crank 159 so that when the shaft 155 makes its revolution the crank 159 will be swung upwardly and then downwardly to thus oscillate the shaft 157. The splined end of a shaft 161 telescopes into the other rear end of the shaft 157 and the other rear portion of the shaft 161 is journaled in a sleeve 163 which is threaded in a bracket 162. Bracket 162 is secured to the body 44. A collar 164 is fixed to the shaft 161 between its splined portion and the sleeve 163. A blade 165, as best seen in Figure 9, is fixed to and extends upwardly from the collar 164 in the normal, at rest, position of the shafts 157 and 161. An expansion coiled spring 166 is mounted on the shaft 161 between the collar 164 and sleeve 163. A handwheel 167 is fixed to the outer end of the sleeve 163 for moving said sleeve through the bracket 162 to vary the tension of the spring 166.

When the crankshaft 155 makes its revolution and the crank 159 is swung upwardly and then back to its position of Figure 9, the blade 165 will be caused to swing clockwise through an arc of less than 90° inwardly of the body 44 through an opening 168 thereof until it substantially contacts the center rod 98 for cutting off the revolving bale mass 132. It will be noted that the blade 165 swings clockwise into the body 44, as seen in Figure 9, and into the bale mass 132 which is rotating in the same direction so that the rotating bale mass will be cut off before the crankshaft 155 has completed one half a revolution and has commenced to swing the blade 165 counterclockwise and back to its at rest position of Figure 9. Since the mass 132 will be moving rearwardly of the body 44 during the cutting and return stroke of the blade 165, the shaft 161 is mounted telescopically in the shaft 157 and sleeve 163 so that the blade can move rearwardly or from left to right of Figure 10 while in the opening 168 and in engagement with the bale mass 132. This rearward movement of the blade 165 and shaft 161 is against the tension of the spring 166 which will thereafter move the blade 165 forwardly after it has completed its return stroke and is out of engagement with the mass 132. It will thus be seen that a length of the rolled mass 132 will be cut off automatically when a leading end of the mass contacts and swings the trip lever 138 outwardly.

A second clutch 169, corresponding to the clutch 153, is mounted on the shaft 78 and in advance of the clutch 153. The clutch 169 is normally held disengaged by a spring pressed rod 170, as seen in Figure 20, in the same manner that the spring pressed rod 149 maintains the clutch 153 disengaged. A cam 171 on the crankshaft 155 momentarily engages a projection 172 of the rod 170 to retract said rod to permit engagement of the clutch 169 so that the drive shaft 78 can cause a shaft 173 to make one complete revolution through a sprocket wheel and chain drive 174 which connects the clutch 169 to the shaft 173. The shaft 173 is connected to two driving rollers 175 by multiple chain and sprocket wheel drives 176, including sprocket wheels of different diameters and whereby the rollers 175 will be caused to make a plurality of revolutions for the single revolution of the shaft 173.

Two cam shafts 177 and 178 are disposed on opposite sides of the shaft 173. The shafts 173, 177, 178 and the shafts forming parts of the chain and sprocket wheel drives 176 are all journaled in suitable bearings 179 which are secured to the chassis 36 beneath the body 44. The shafts 177 and 178 are driven from the shaft 173 by sprocket wheel and chain drives 180. Small cam shafts 181 are mounted in additional bearings 179 on opposite sides of the shaft 173 and carry cams 182 and 182′. Said cam shafts 181 are likewise driven from the shaft 173 by sprocket wheel and chain drives 183. A reverse gearing unit 184 is interposed between the shaft 173 and the shaft 178 and shaft 181, which carries the cam 182′. Said shaft carrying the cam 182′ is disposed on the same side of the shaft 173 as the shaft 178. Thus, the shaft 181 of the cam 182′ and the shaft 178 turn in the same direction but in the opposite direction from the shaft 177 and the shaft 181 of the cam 182. The two cam shafts 177 and 178 are longitudinally offset relative to one another and each carries two cams 185 and 186 which are disposed opposite to one another. Likewise, said cams of the two shafts 177 and 178 are disposed on opposite ends of said shafts.

A cam shaft 187 is journaled in additional bearings 179 and is driven by a sprocket wheel and chain drive 188 from the cam shaft 178. The cam shaft 187 carries two cams 189 and 190. The cam 189 is disposed over and engages one end of a rocker arm 191, when said cam is revolved.

As seen in Figures 8 and 15, the rollers 175 are disposed for rotation in openings 192 of the body 44, so that the rollers 175 are disposed in the lower part of the twining chamber 136 and turn counterclockwise, as seen in Figure 8, for rotating the cut off bale 132 while it is being bound with twine, as will hereinafter be described.

Rocker arms 193 are pivotally mounted by brackets 194 which extend outwardly from the sides of the body 44. Corresponding upper ends of the rocker arms 193 have pressing rollers 195 journaled thereon and which extend inwardly through circumferentially elongated openings 196 of the body 44. As seen in Figures 8 and 15, push rods 197 are reciprocably mounted in guides 198 which extend outwardly from the sides of the body 44. The upper ends of the push rods 197 are pivotally connected to the opposite outwardly projecting lower ends of the rocker arms 193 and the lower ends of the push rods are disposed over and engaged by the cams 182 and 182'. Said cams are of long duration so that the rollers 195 will be held displaced inwardly during substantially the entire rotation of the cam 182. Rollers 195 press the bale mass downwardly against the rollers 175, so that said latter rollers can effectively revolve the bale 132 while it is in the twining chamber 136 and after it has been cut off from the remainder of the mass 132 by the knife 165, as previously described.

As best illustrated in Figures 11 and 15, bearings 199 are secured to the top portion of the body 44 above the twining chamber 136 and journal a shaft 200 which extends across the top of the body 44. A crank arm 201 is fixed to and extends downwardly from the left hand end of the shaft 200 and is inclined forwardly. A connecting rod 202 is pivotally connected to and extends downwardly from the crank arm 201 and has its lower end pivotally connected to an outer end of the rocker arm 191. A second crank 203 is connected to the left hand portion of the shaft 200 and extends downwardly and rearwardly therefrom, and is spaced inwardly relative to the crank 201. A bearing 204 is mounted on the left side of the body 44, forwardly of the bearings 199 and has a short shaft 205 journaled therein. A crank 206 is fixed to and extends upwardly from the inner end of the shaft 205 and is normally inclined upwardly and rearwardly. A guide tube 207 is secured to and extends downwardly and forwardly from the outer end of the shaft 205. A rod 208 connects the free ends of the cranks 203 and 206. A crank 209 is fixed to and extends upwardly and forwardly from the other right hand end of the shaft 200. A bearing 210 is secured to the right hand side of the body 44, rearwardly of the bearings 199, and journals a transversely disposed shaft 211. A crank 212 is fixed to and extends upwardly and forwardly from the inner end of the shaft 211 and is connected to the crank 209 by a rod 213. A twine guiding tube 214 is secured to and extends downwardly and rearwardly from the outer end of the shaft 211.

Referring to Figures 12, 13 and 14, the right hand side of the body 44 below the bearing 210 is provided with a longitudinally elongated opening 215. Bearings 216 are secured to the outer side of the body 44 beneath the ends of the opening 215 to provide journals for shafts 217, which shafts support twine anchoring units 218 and 219, each of which includes a rocker arm 220 which is connected to the shaft 217 at a point spaced from its ends and which has a roller 221 journaled in the lower end thereof. The roller 221 of the unit 218 is disposed on the outer side of and is engaged by the cam 185 and the roller 221 of the unit 219 is similarly disposed to be engaged by the cam 186. A pull spring 222 urges the lower end of the rocker arm of each unit inwardly or toward the shaft 178 and against a limiting stop 223 of the bracket 216, which holds the roller 211 properly spaced from the shaft 178 and its cam 185 or 186. A twine punch 224 is pivotally mounted intermediate of its ends on the upper end of each rocker arm 220 for vertical swinging movement relative to the rocker arm. The punch 224 has a bifurcated or notched inner end 225. A pull spring 226 is connected to the outer end of each punch 224 and to the rocker arm 220 for urging the inner end 225 of the punch to swing upwardly. This counterclockwise swinging movement of the punch 224, as seen in Figure 13, is limited by a stop 227 on the rocker arm 220. The upper side of the inner portion of the punch 224, of the unit 219 only, carries a twine cutting blade 228. A guide 229 is mounted on the outer side of the body 44 and extends over the end of the opening 215, adjacent which the unit 218 is disposed. A second twine guide 230 is similarly mounted relative to the other end of the opening 215.

An opening 231 is formed in the opposite side of the body 44 from the opening 215 and is disposed beneath the bearing 204. The opening 231 is likewise longitudinally elongated and differs slightly in shape from the opening 215, as seen in Figure 15. A twine guiding rod 232 is secured externally to the body 44 and extends diagonally downwardly and rearwardly across the opening 231. A second pair of twine anchoring units 233 and 234 are mounted beneath the forward and rear ends, respectively, of the opening 231. Said twine anchoring units 233 and 234 correspond in structure with the twine anchoring units 218 and 219, except that each unit 233 and 234 has a compression spring 226' substituted for the tension spring 226 and its limiting stop 227' limits downward swinging movement of the notched inner end 225' of its twine anchoring punch 224'. A stationary twine guide 235 is fastened to the body 44 and overlies the forward end of the opening 231 below the upper end of the rod 232. A stationary twine guide 236 is secured to the body 44 and partially overlies the other rear end of the opening 231 and has a twine guiding roller 237 and a stationary knife 238, which is disposed above the roller 237, as best seen in Figure 32. The twine punch 224' of the anchoring unit 234 carries a blade 238' which cooperates with the blade 238. As seen in Figures 1 and 3, twine holders 239 are mounted on the outer side of the body 44 for supplying twine 240 to the twine tubes 207 and 214.

The cam 189 during its complete revolution at a slow speed depresses the inner end of the rocker arm 191 to elevate the outer end thereof and the push rod 202 to swing the crank 201 and the parts connected thereto clockwise as seen in Figure 15. Immediately before the cam 189 engages the rocker arm 191, the two cams 185 engage the rollers 221 of the twine anchoring units 218 and 233 for causing the twine punches 224 and 224' thereof to be swung inwardly, as illustrated in Figure 14. The twine depending from the tube 214 and which is disposed against the twine guide 229 is engaged by the punch 224 of the unit 219 and is driven thereby into the downwardly traveling side of the bale 132. Said punch 224 swings downwardly relative to the arm 220 as it thus anchors the twine 240. At the same instant the punch 224' of the unit 233 engages the twine from the tube 207 and which is disposed against the guide 235 for anchoring the twine to the other upwardly rotating side of the bale mass 132, beneath the upper end of the rod 232. Said punch 224 yields upwardly as it penetrates the upwardly moving side of the mass 132 and against the tension of its spring 226'. The cams 185 are of very short duration, as shown in Figures 13 and 14, so that said cams quickly disengage the rollers of the units 218 and 226' to allow the springs 222 and 222' to quickly retract the punches 224 and 224'.

Immediately after the twine is thus anchored by the units 218 and 233, the crank 201 is rocked clockwise, as previously described and as seen in Figure 15, to cause the tube 207 to swing rearwardly and the tube 214 to swing forwardly relative to the twining chamber 136. Said tubes swing through arcs so that their lower ends assume positions adjacent the guides 236 and 230, respectively, while the shafts 178 are completing a half revolution for moving the cams 186 into engagement with the rollers of the twine anchoring units 219 and 234. It will be apparent that swinging movement of the tubes 207 and 214 longitudinally of the body 44 in directions toward one another will cause the twine 240, which is extending from the lower ends of said tubes to be wound spirally around the bale 132 from the ends thereof toward its center. Said bale 132 is revolved a plurality of times by the rollers 175, which are turned at high speeds, during the time that the tubes 207 and 214 complete their arc of swinging movement lengthwise of the body 44. Thus, the bale 132 is securely bound spirally with the twine 240 from end-to-end thereof.

As the twine from the tube 214 moves into engagement with the stationary guide 230, the cam 186 will engage the roller 221 of the anchoring unit 219 to swing the punch 224 thereof inwardly so that its forked end 225 will engage the twine which is in contact with the guide 230 and will drive the twine into the downwardly traveling bale 132, in the same manner as previously described in reference to the punch 224. However, as the twine is driven inwardly the blade 228 will cut off the twine above the punch 224. At the same instant, the other cam 186 will rock the anchoring unit 234 in the same manner to cause its punch 224' to swing inwardly over the lower end of the rod 232 for driving and anchoring the twine 240 from the tube 207 in the upwardly traveling side of the bale 132. As seen in Figure 15, the twine from the tube 207 will be engaged by the roller or pulley 237 and held properly positioned to be engaged by the punch 224'. In addition, the roller 237 holds a portion of the twine extending upwardly therefrom to the tube 207, properly positioned so that as the punch 224' of the anchoring unit 234 swings inwardly the twine 240 will be cut between the pulley 237 and tube 207 by engagement between the blades 238 and 238'. In the aforedescribed manner, the bale which has been cut off by the knife 165 will be securely wound and tied automatically.

Immediately after this tieing operation is completed the cam 190 (Figure 20) will move into engagement with a push rod 242 which is connected to and will rock the bell crank 243 clockwise. A rod 244 which is connected to the bell crank 243 is thus retracted out of engagement with the clutch actuating arm 245 of a clutch 246. The clutch 246 corresponds with the clutch 153 and is mounted on a shaft 247. Shaft 247 is journaled in bearings 248 which are supported by the chassis 36 and at the side thereof opposite to the shaft 78. Shaft 247 is connected to shaft 78 by a sprocket wheel and chain drive 249. A spring 250 carried by the push rod 242 will return said rod and the rod 244 to their positions of Figure 20, immediately after the clutch 246 has been engaged, so that both clutch halves will make only one revolution with the shaft 247.

A rear cross shaft 251 of the machine 35 is journaled in bearings 252 and is connected to the shaft 247 by bevel gears 253. An arm 254 is journaled on an inner portion of the shaft 251 and extends forwardly and upwardly therefrom. Arm 254 has a toothed wheel 255 rotatably mounted in its bifurcated free end and fixed to a shaft 256. The shaft 256 is journaled in the free end of the arm 254 and is connected to the shaft 251 by a sprocket wheel and chain drive 257.

An ejector 258, as best seen in Figures 1, 2, 3 and 20, includes an endless toothed chain 259 which is trained over sprocket wheels 260 fixed to shafts 261. Shafts 261 are journaled in bearings 262 which are secured to the underside of the bottom portion of the body 44, at the rear end thereof. The endless chain 259 is disposed longitudinally of the body 44 and extends through the slot 263 in the bottom of said body so that the upper flight of the chain 259 is disposed within the body 44 at its open rear end 137. The forwardmost shaft of the ejector unit 258 is connected by a sprocket wheel and chain drive 264 to the shaft 251 so that the ejector chain 259 like the ejector wheel 255 will be continuously driven.

A rocker arm 265 is disposed crosswise of the machine 35 and has an inner end engaging under a portion of the arm 254 and an outer end disposed beneath a cam 266. Cam 266 is fixed to a shaft 267 which is journaled in bearings 268. Shaft 267 is connected to the disengageable half of the clutch 246 by a sprocket wheel and chain drive 269. Thus, immediately after the bale has been tied the push rod 242 will be actuated by the cam 190 to engage the clutch 246 so that the cam 266 will be revolved to actuate the rocker arm 265 for thus elevating the arm 254. This will cause the toothed wheel 255 to be swung upwardly through a slot 270 (Figure 1) in the bottom of the twining chamber 136 and into engagement with the bound bale 132. The ejector wheel 255 is revolving in a direction for moving the bound bale 132 rearwardly and into engagement with the ejector chain 259, which is also operating continuously, for ejecting the bound bale 132 through the open rear end 137 of the body 44. In this manner the bound bale is quickly ejected from the body 44 so that the release lever 138 can resume its position of Figures 18 and 20 to be engaged by the next rearwardly moving portion of the rolled mass 132, so that the operation previously described, including cutting off the mass by the knife 165 and binding the cut off mass, may be repeated. It will thus be seen that the operation of the machine 35 will be continuous and automatic and with the fully bound bales being intermittently discharged from the open rear end 137 of the body 44.

Access may be had to the forming chamber 71 through a hinged closure 271, as seen in Figures 1, 2 and 3. Various other access openings and other attachments may be provided.

Various forms of clutches may be utilized. One such clutch 153, 169 or 246 is illustrated in Figures 25, 26 and 27. The clutch 153, for example, includes a clutch half 272 which is fixed to the shaft 78 and which has internal teeth 273. The other disengageable clutch half 274 has a shaft 275 journaled therein and which is disposed parallel to the shaft 78. The actuator 152 is fixed to the outer end of the shaft 275 and an arm 276 is fixed to the inner end of said shaft. A roller 277 is supported by and journaled on the outer end of the arm 276. A compression spring 278 urges the free end of the arm 276 to swing away from the axis of the clutch to cause the roller 277 to engage between two of the teeth 273 for engaging the clutch half 274 with the clutch half 272. However, when the actuator 152 moves into engagement with the rod 149 the shaft 275 is caused to turn for swinging the arm 276 toward the axis of the clutch 153 to disengage the roller 277 from the teeth 273 so that the clutch half 272 can turn with the shaft 78 relative to the clutch half 274.

In addition to the continuous automatic operation of the baler 35, as heretofore described, it will be readily obvious that the tubular body 44 and its horizontal disposition on the chassis 36 provides a machine having an extremely low center of gravity so that the baler 35 can operate efficiently on uneven ground and sloping terrain.

Various modifications and changes are contemplated and may be resorted to, without departing from the function or scope of the invention as hereinafter defined by the appended claims.

I claim as my invention:

1. A baling machine comprising an elongated mobile support, an elongated tubular body supported by and disposed longitudinally of the mobile support and positioned with its axis in substantially a horizontal plane, said body including an open rear discharge end and a forward end, said body having an entrance opening in one side thereof and adjacent its forward end for receiving material to be baled, the forward portion of said body constituting a forming chamber in which the material is received from the entrance opening, driven means contained in said forming chamber and forming the material into a rolled mass and for urging the rolled mass rearwardly through the body, said body including an intermediate portion defining a compressing chamber, compressing means contained in said compressing chamber for revolving and compressing the mass during its rearward movement through said compressing chamber, said body having a twining chamber disposed between the compressing chamber and the rear discharge end of the body for receiving the compressed mass of rolled material from the compressing chamber, a knife supported by said body between the compressing chamber and twining chamber and swingably movable to an operative position for cutting off a portion of the revolving mass within the twining chamber from the remainder of the mass, trigger means disposed in the twining chamber and engaged by the leading end of the mass for controlling the movement of the knife to an operative and inoperative position, intermittently driven means extending into the twining chamber for revolving the cut off portion of the mass at an accelerated r.p.m. relative to the remainder of the mass, means supported for swinging movement on said body and controlled by operation of said trigger means for supplying and anchoring twine to the cut off portion of the rolled mass while the mass is revolved by the intermittently driven means for binding said cut off mass portion to form a bale, and continuously driven ejector means extending into the bottom portion of the body adjacent said discharge end for ejecting the bound bale from the machine through said discharge end.

2. A baling machine as in claim 1, oppositely driven compressing rolls mounted on the mobile support for feeding the material to be baled to the body through said inlet and for compressing the material into a flat sheet.

3. A baling machine as in claim 2, and driven elevator and conveying means mounted on the mobile support for picking up the material to be baled from the ground and for conveying the material to the compressing rolls.

4. A baling machine as in claim 1, said driven means of the forming chamber comprising a plurality of frames supported substantially longitudinally within the forming chamber, an endless driven web supported by each frame, said webs being disposed at various angles to one another such that the material entering the forming chamber and engaged by said webs is wound into a roll between the webs.

5. A baling machine as in claim 4, means swingably supporting said frames at the forward ends thereof and at the forward end of the forming chamber for swinging movement of the frames toward and away from the axis of the body, spring means urging the frames and webs to swing inwardly, and said frames and webs yielding outwardly in response to pressure of the compressed mass whereby the spacing between the rear ends of the frames and webs will be greater than the spacing between the forward ends thereof for causing the compressed mass to be forced rearwardly through the body.

6. A baling machine as in claim 5, and resiliently mounted resistor elements supported by said body and extending into the body between the forming chamber and compressing chamber for resisting rearward movement of the rolled mass from the forming chamber, said resistor elements being supported for yieldable rearward swinging movement.

7. A baling machine as in claim 6, and means for adjusting the spring tension on said resistor elements.

8. A baling machine as in claim 1, said compressing means including a plurality of rotary driven longitudinally extending and circumferentially spaced compressing rollers, and means yieldably urging said rollers inwardly of the compressing chamber.

9. A baling machine as in claim 8, said compressing means additionally including a plurality of plates disposed between said rollers, and means spring urging said plates inwardly of the compressing chamber, said plates cooperating with the rollers for tightly compressing the revolving mass.

10. A baling machine as in claim 1, and an elongated bore forming element supported by and disposel axially of the body for forming a hollow bore centrally through the bale.

11. A baling machine as in claim 1, means slidably supporting said knife for movement longitudinally of the body to permit the knife to yield rearwardly of the body while in an operative position for cutting the rearwardly traveling rolled mass, and spring means urging said knife forwardly of the body.

12. A baling machine as in claim 1, said intermittently driven means comprising rollers disposed longitudinally of the bottom portion of the twining chamber, a main drive shaft journaled on and extending longitudinally of the mobile support, and clutch means actuated by said trigger means for effecting a driving connection between said drive shaft and said rollers.

13. A baling machine as in claim 12, pressing rollers disposed in the upper part of said twining chamber, means supported by said body for swingably supporting and journaling said pressing rollers, and cam means actuated by said clutch means for actuating said roller supporting means for displacing the pressing rollers inwardly and downwardly against the rolled mass for pressing the rolled mass tightly against the driven rollers.

14. A baling machine as in claim 13, said twine supplying and anchoring means including tubes swingably supported on the body and externally thereof and through which strands of twine are adapted to extend, said body having elongated openings in the sides thereof opening into opposite sides of the twining chamber, said openings being longitudinally staggered relative to one another, said tubes having lower discharge ends disposed for swinging movement longitudinally along said openings for supplying the twine through said openings to the end portions of the cut off rolled mass, and link and lever means connected to the drive shaft by said clutch means for swinging the discharge ends of the twine tubes simultaneously in opposite directions longitudinally of the body for supplying the twine to be wound spirally on the end portions of the revolving cut off rolled mass.

15. A baling machine as in claim 14, said twine supplying and anchoring means including punches swingably mounted externally of the body at each end of each opening, cam means connected to the drive shaft by said clutch means for alternately actuating the punches at the two ends of each of the openings when the discharge end of the twine guide tube, associated with the opening, is disposed directly above the punch, said punches functioning, when actuated, to engage the twine and to drive the twine into the revolving rolled mass for anchoring the twine thereto.

16. A baling machine as in claim 15, and cutting means associated with certain of said punches for cutting off the twine beneath and spaced from the tubes.

17. A baling machine as in claim 16, said ejector means including an endless driven conveyor mounted in the bottom of the body rearwardly of the twining chamber and a rotary driven toothed wheel disposed forwardly of said endless conveyor and beneath the twining chamber, means swingably supporting said toothed wheel, and cam actuated means driven by said drive shaft and controlled by such clutch means for swinging the toothed wheel upwardly into engagement with the bound bale, after completion of the twining operation, for conveying the bound bale rearwardly into engagement with said endless driven conveyor.

References Cited in the file of this patent

UNITED STATES PATENTS 2,096,990     Luebben  _____ Oct. 26, 1937
2,817,944     Callum  _____ Dec. 31, 1957